United States Patent
Haydn et al.

(10) Patent No.: US 10,312,540 B2
(45) Date of Patent: Jun. 4, 2019

(54) MULTI-LAYERED LAYER ARRANGEMENT FOR A SOLID ELECTROLYTE

(71) Applicants: PLANSEE COMPOSITE MATERIALS GMBH, Lechbruck am See (DE); FORSCHUNGSZENTRUM JUELICH GMBH, Juelich (DE); FRAUNHOFER GESELLSCHAFT ZUR FOERDERUNG DER ANGEWANDTEN FORSCHUNG E. V., Munich (DE)

(72) Inventors: Markus Haydn, Reutte (AT); Matthias Ruettinger, Reutte (AT); Thomas Franco, Kempten (DE); Sven Uhlenbruck, Pulheim (DE); Thomas Jung, Sickte (DE); Kai Ortner, Braunschweig (DE)

(73) Assignees: Plansee Composite Materials GmbH, Lechbruck am See (DE); Forschungszentrum Juelich GmbH, Juelich (DE); Fraunhofer Gesellschaft zur Foerderung der angewandten Forschung e.V., Munich (DE)

( * ) Notice: Subject to any disclaimer, the term of this patent is extended or adjusted under 35 U.S.C. 154(b) by 160 days.

(21) Appl. No.: 14/892,891

(22) PCT Filed: May 20, 2014

(86) PCT No.: PCT/EP2014/001352
§ 371 (c)(1),
(2) Date: Nov. 20, 2015

(87) PCT Pub. No.: WO2014/187559
PCT Pub. Date: Nov. 27, 2014

(65) Prior Publication Data
US 2016/0118680 A1  Apr. 28, 2016

(30) Foreign Application Priority Data

May 21, 2013  (DE) .................. 10 2013 008 472

(51) Int. Cl.
*H01M 8/124* (2016.01)
*H01M 8/1004* (2016.01)
(Continued)

(52) U.S. Cl.
CPC ......... *H01M 8/1004* (2013.01); *H01M 8/124* (2013.01); *H01M 8/1213* (2013.01);
(Continued)

(58) Field of Classification Search
CPC ............ H01M 8/1004; H01M 8/1213; H01M 8/124–8/126; H01M 2008/1293;
(Continued)

(56) References Cited

U.S. PATENT DOCUMENTS 5,171,645 A * 12/1992 Khandkar ............... B32B 18/00
427/115
6,558,831 B1  5/2003 Doshi et al.
(Continued)

FOREIGN PATENT DOCUMENTS

AT         8975 U1    3/2007
CN      1960048 A    5/2007
(Continued)

OTHER PUBLICATIONS

Ho et al., "Growth control of oxygen stoichiometry in homoepitaxial SrTiO3 films by pulsed laser epitaxy in high vacuum," Scientific Reports, Scientific reports 6 (2016), article No. 19941 (Year: 2016).*

(Continued)

*Primary Examiner* — Eugenia Wang
(74) *Attorney, Agent, or Firm* — Laurence A. Greenberg; Werner H. Stemer; Ralph E. Locher

(57) ABSTRACT

A cathode-electrolyte-anode unit for an electrochemical functional device, in particular a high-temperature fuel cell. The unit has a multi-layer solid-state electrolyte arranged between a porous anode and a porous cathode. The solid-state electrolyte is produced by a vapor deposition process and has a sandwich-type structure consisting of at least one first layer with a lower oxygen content, and at least one second layer with a higher oxygen content. The individual layers have substantially the same composition, with the exception of oxygen.

10 Claims, 4 Drawing Sheets

(51) Int. Cl.
*H01M 8/1213* (2016.01)
*H01M 8/1246* (2016.01)
*H01M 8/1253* (2016.01)

(52) U.S. Cl.
CPC ........ *H01M 8/1246* (2013.01); *H01M 8/1253* (2013.01); *H01M 2008/1293* (2013.01); *H01M 2300/0074* (2013.01); *H01M 2300/0077* (2013.01); *H01M 2300/0094* (2013.01); *Y02E 60/525* (2013.01); *Y02P 70/56* (2015.11)

(58) Field of Classification Search
CPC . H01M 2008/0077; H01M 2008/0094; H01M 2008/0074; Y02P 70/56; Y02E 60/525
See application file for complete search history.

(56) References Cited

U.S. PATENT DOCUMENTS

| | | | |
|---|---|---|---|
| 6,849,354 | B2 | 2/2005 | Hara et al. |
| 7,179,500 | B2 | 2/2007 | Park et al. |
| 8,163,435 | B2 | 4/2012 | Glatz et al. |
| 2006/0269813 | A1 | 11/2006 | Seabaugh et al. |
| 2007/0269701 | A1* | 11/2007 | Larsen ............... H01M 4/8621 429/489 |
| 2009/0029195 | A1 | 1/2009 | Gauckler et al. |
| 2011/0223519 | A1* | 9/2011 | Kang ................. H01M 4/9033 429/483 |
| 2011/0236794 | A1 | 9/2011 | Donet et al. |
| 2012/0094213 | A1* | 4/2012 | Ha ...................... H01M 8/1246 429/495 |
| 2012/0178016 | A1* | 7/2012 | Park .................... C01G 29/006 429/482 |
| 2012/0321990 | A1* | 12/2012 | Chang ................ H01M 8/1246 429/482 |

FOREIGN PATENT DOCUMENTS

| | | |
|---|---|---|
| DE | 102007015358 A1 | 10/2008 |
| EP | 1170812 A2 | 1/2002 |
| EP | 1513623 B1 | 3/2005 |
| EP | 1520290 A2 | 4/2005 |
| EP | 2083466 A1 | 7/2009 |
| FR | 2935843 A1 | 3/2010 |
| JP | 2003142123 A | 5/2003 |
| JP | 2003171177 A | 6/2003 |
| JP | 2006164801 A | 6/2006 |
| WO | 9741612 A1 | 11/1997 |
| WO | 0217420 A2 | 2/2002 |
| WO | 2005057685 A2 | 6/2005 |
| WO | 2007045111 A1 | 4/2007 |

OTHER PUBLICATIONS

Franco, Th.,et al. Development and Industrialization of Metal-Supported Solid Oxide Fuel Cells, Forschungszentrum Juelich GMBH, Institute of Energy and Climate Research, 52425 Juelich, Germany, 2012

"Multi-Layer Thin-Film Electrolytes for Metal Supported Solid Oxide Fuel Cells" Journal of Power Sources 256 (2014) 52-60, Journal Hompage: www.elsevier.com/locate/jpowsour.

"Development of Metal Supported Solid Oxide Fuel Cells Based on Powder Metallurgical Manufacturing Route", 2013 Institute of Material, Minerals and Mining Published by Maney on Behalf of the Institute; Accepted Sep. 11, 2013, 2013.

Escalona, N. Jordan, "Herstellung von Hochtemperatur-Brennstoffzellen ueber physikalische Gasphasenabscheidung" [Production of high-temperature fuel cells via physical vapour deposition], Dissertation, Univ. Bochum 2008, published by Forschungszentrum Juelich GmbH—Reihe Energie & Umwelt, vol. 32, ISSN 1866-1793—English abstract on p. 8.

\* cited by examiner

MULTI-LAYERED LAYER ARRANGEMENT FOR A SOLID ELECTROLYTE

BACKGROUND OF THE INVENTION

Field of the Invention

The invention relates to a cathode-electrolyte-anode unit for an electrochemical functional device, more particularly for a high-temperature fuel cell, and to an associated production method.

High-temperature fuel cells (Solid Oxide Fuel Cells—SOFC) allow direct conversion of chemical energy into electrical energy. The electrochemically active cell of an SOFC consists of what is called a cathode-electrolyte-anode unit (individual cell), in which a gas-impervious solid electrolyte is arranged between a gas-permeable anode and a gas-permeable cathode. This solid electrolyte usually consists of a solid ceramic material comprising metal oxide that conducts oxygen ions but not electrons.

In the operation of an SOFC, the anode is supplied with fuel (for example hydrogen or conventional hydrocarbons, such as methane, natural gas, biogas, etc.), which is oxidized there catalytically, giving off electrons. The electrons are taken from the fuel cell and flow via an electrical consumer to the cathode. At the cathode, an oxidant (for example oxygen or air) is reduced by acceptance of the electrons. The electrical circuit is completed by the oxygen ions flowing via the electrolyte to the anode and reacting with the fuel at the corresponding interfaces.

Known from the prior art for SOFC systems are various embodiments, which will be briefly outlined below.

In a first variant, technically the most advanced, the electrolyte is the mechanically supporting cell component (Electrolyte Supported Cell, ESC). The layer thickness of the electrolyte here is relatively large, around 100-150 µm, and consists usually of zirconium dioxide stabilized with yttrium oxide (YSZ) or with scandium oxide (ScSZ). In order to obtain sufficient ion conductivity on the part of the electrolyte, these fuel cells have to be operated at a relatively high operating temperature of around 850-1000° C. This high operating temperature imposes exacting requirements on the materials used.

The efforts for a lower operating temperature have led, consequently, to the development of various thin-layer systems. These include anode-supported or cathode-supported cell SOFC systems, in which a relatively thick (at least around 200 µm) mechanically supporting ceramic anode substrate or cathode substrate is connected to a thin, electrochemically active anode or cathode functional layer, respectively. Since the electrolyte layer no longer has to fulfil a mechanically supporting role, it can be made relatively thin and the operating temperature can be reduced accordingly on the basis of the lower ohmic resistance.

Besides these purely ceramic systems, as a more recent generation, SOFC thin-layer systems have been developed which are based on a metallic carrier substrate, known as metal-supported SOFCs (Metal-Supported Cell, MSC). These metallo-ceramic composite systems exhibit advantages over purely ceramic thin-layer systems in terms of manufacturing costs, thermal and redox cyclability and mechanical stability, and by virtue of their thin-layer electrolyte can be operated, moreover, at an even lower operating temperature of about 600° C. to 800° C. On account of their specific advantages, they are suitable especially for portable applications, such as for the electrical supply of cars or utility vehicles, for example (APU—Auxiliary Power Unit). An exemplary MSC known from the prior art consists of a porous and hence gas-permeable metallic carrier substrate with a thickness of around 1 mm, arranged on which there is a cathode-electrolyte-anode unit with a thickness of 60-70 µm, the layer arrangement that is actually electrochemically active. Typically, the anode faces the carrier substrate, and is closer to the metal substrate than the cathode in the sequence of the layer arrangement.

Intense research activities into boosting the performance of SOFC systems, particularly for anode-, cathode- or metal-substrate-supported SOFCs, are aimed at reducing the layer thickness of the electrolyte, while maintaining a sufficient gas-imperviosity (leakage rate<$1.0\times10^{-3}$ hPa dm$^3$/(s cm$^2$)) (measured under air with the pressure increase method (Dr. Wiesner, Remscheid, type: Integra DDV) with a pressure difference dp=100 hPa).

Known manufacturing methods for ceramic thin-layer electrolytes, besides wet-ceramic processes such as wet powder coating or screenprinting, where the electrolyte is subsequently sintered for the required imperviosity to gas (at about 1400° C. in the case of use of yttrium-stabilized zirconium oxide (YSZ)), include coating methods such as, for example, physical vapour deposition (PVD). Coating methods such as PVD have considerable advantages on account of the reduced operational temperature, especially for metal-substrate-supported SOFCs. While coating methods are generally used in order to modify the properties of predominantly smooth surfaces, a challenge facing the use of PVD for SOFCs is that of depositing a gas-impervious layer which is as thin as possible on a porous substrate such as the anode, for example. Layer growth and the microstructure (critical for gas permeability) of the applied electrolyte layer are influenced substantially by the surface structure of the substrate (porosity, surface roughness, cracks, defects, etc.).

In the case of electrode-supported SOFCs, success has been achieved in the past, using PVD, in realizing gas-impervious electrolytes having a layer thickness of below 3 µm (DE 10 2007 015 358 A1). The thin layer thickness of the electrolyte is achieved by pretreating the surface of the anode substrate, to reduce the porosity, before the PVD coating operation. For example, near-surface pores in the anode comprising a mixture of nickel oxide (NiO) and of zirconium oxide fully stabilized with 8 mol % of yttrium oxide (8YSZ) can be sealed by a YSZ suspension applied by vacuum slip casting, to produce, after subsequent sintering, a sufficiently smooth surface structure of the anode substrate, onto which an electrolyte with a dense structure can be deposited (N. Jordan-Escalona, Production of high-temperature fuel cells via physical vapour deposition, Dissertation, Univ. Bochum 2008). The necessary gas-permeability of the anode comes about during the first operation of the fuel cell, when the NiO in the anode is reduced to metallic Ni and as a result the porosity of the anode rises to about 20% to 30%. For the purpose of optimization, a version of the electrolyte composed of a multi-layered layer assembly of gadolinium-doped cerium oxide (CGO), YSZ and CGO is known (DE 10 2007 015 358 A1).

An attempt to transpose this manufacturing method, used for anode-supported SOFCs, to metal-substrate-supported SOFCs (MSC) comes up against the following operational difficulty: owing to the metallic carrier substrate, the operating steps for MSC have to take place in a reducing atmosphere, and the sintering of the anode takes place under low oxygen partial pressure. Under these conditions, the Ni in the anode is already predominantly in metallic form and is coarsened—grain sizes of up to about 1 µm may occur.

The anode of an MSC, which is present in reduced form and is to be coated, therefore has a significantly greater surface roughness and larger pores than the oxidized anode in the case of electrode-supported SOFCs. For this reason, with MSC electrolytes produced using PVD, it is at present possible to achieve sufficient gas-impermeability only with an electrolyte layer thickness of above about 5 μm (Thomas Franco et al., Development and Industrialization of Metal-Supported SOFC; 10$^{th}$ European SOFC Forum 2012; Lucerne, Switzerland). An example of an MSC of this kind is shown by FIG. 1. In that case, an 8YSZ electrolyte with a thickness of approximately 5 μm was applied by a sputtering method to a presintered anode comprising a mixture of Ni and 8YSZ. The carrier for the anode is a powder-metallurgically produced carrier substrate based on an iron-chromium alloy, with a diffusion barrier layer of CGO being situated between metal substrate and anode. With supply of oxygen as reactive gas, the electrolyte is produced from a metallic ZrY sputtering target. Owing to the layer growth, the electrolyte has a stem structure, with individual stems possibly interspersing the entire thickness of the electrolyte and with the formation, along the grain boundaries, of interstices where gas is able to diffuse through. In order to achieve sufficient gas-imperviosity, therefore, the electrolyte must have a corresponding thickness.

Also known from the prior art for reducing the gas permeability of electrolytes produced by means of coating methods are hybrid methods in which the coating operation is followed by a thermal treatment step.

One such example is found in EP 2 083 466 A1, where the electrolyte applied by means of a sputtering process is compacted in a subsequent sintering step. In EP 2 083 466 A1, to form the electrolyte, first of all a first layer of an oxidic sputtering target, for example 8YSZ is deposited on an anode layer by means of an RF (radio-frequency) magnetron sputtering method, and in a subsequent step a second layer is applied from a metallic sputtering target, for example $Zr_x Y_{1-x}$, by means of a reactive sputtering method (DC or RF). This anode-electrode unit is subsequently subjected to a sintering operation at around 1400° C. for a duration of approximately 6 hours, before a cathode layer is applied in a concluding step. A disadvantage is that two production units with two different sputtering targets are required, and an expensive and time-consuming sintering step at high temperatures is necessary in order to consolidate the electrolyte layer. Owing to the high operating temperature, moreover, this method is not suitable for MSCs.

Another approach to producing a gas-impermeable, extremely thin electrolyte layer, combining a coating method with a subsequent heat-treatment step, is disclosed in EP 1 513 623 B1. In EP 1 513 623 B1, a fine-pored aluminum substrate (pore diameter up to 200 nm) is coated by means of a DC sputtering method, using an yttrium-zirconium (YZ) sputtering target, after which the metallically deposited YZ is oxidized to YSZ in an oxidizing atmosphere at around 300° C.-400° C., and is subjected to a concluding heat-treatment step at about 700° C. in order to form a uniform film. In this way, a gas-impervious electrolyte of single-ply design, with a layer thickness of less than 500 nm, was obtained. The method has only limited possibility for transposition, especially in the case of MSCs, for practical application, since on the one hand the substrate pore size in the case of MSC is greater, and on the other hand the aluminum present with an oxide layer would have to be made electrically conductive for use as an electrode.

Moreover, from the patent literature, a variety of multi-layered layer systems for electrolytes are known: for example, WO 2007/045111 A1, WO 02/17420 A1 or WO 2005/057685.

For MSCs in particular there is a need for ongoing development of the electrolyte. The requirements imposed on the electrolyte of an electrochemical functional device such as an SOFC can be summarized as follows: high oxygen ion conductivity and low electron conductivity at operating temperature, chemical and mechanical stability in the process gas atmosphere used (air atmosphere or fuel gas atmosphere), good adhesion properties with subsequent functional layers, and sufficient gas-imperviosity to separate the process gas on the anode side (fuel gas) from the process gas on the cathode side (air).

BRIEF SUMMARY OF THE INVENTION

The problem on which the present invention is based is that of providing an inexpensive cathode-electrolyte-anode unit for use in an electrochemical functional device, more particularly in a high-temperature fuel cell, where the electrolyte satisfies the requirements set out above and has an extremely low ohmic resistance. The method for producing a cathode-electrolyte-anode unit of this kind is to be suitable in particular for an MSC.

This problem is solved by the subject matter and methods with the features according to the independent claims.

Proposed in accordance with the invention is a cathode-electrolyte-anode unit in which the solid electrolyte arranged between cathode and anode is of multi-layered embodiment and is produced by means of physical vapour deposition. Physical vapour deposition includes, in particular, sputtering (cathodic atomization), reactive sputtering (reactive cathodic atomization), vapour deposition by means of an electron beam (electron-beam physical vapour deposition), laser beam evaporation (pulsed laser deposition) or comparable coating methods, or a combination of these coating methods. The solid electrolyte has a layered structure of at least one first layer and at least one second layer, with the second layer having a higher oxygen content than the first layer and with the two layers having substantially the same composition, except for oxygen, down to trace elements. The two layers therefore differ primarily in their oxygen content.

The first layer with lower oxygen content may be metallically applied; the second layer with higher oxygen content may be oxide-ceramically applied. By metallically applied is meant the deposition of a metallic compound which has been converted beforehand (by means of a sputtering process, for example) into the gas phase; by oxide-ceramically applied is meant the deposition of an oxide of this metallic compound. The metal oxide here may be deposited, for example, using a (sputtering) target consisting of the metal oxide or using a metallic target with supply of oxygen as reactive gas (reactive sputtering). As an inevitable consequence of the process, owing for example to residual oxygen in the coating unit, some oxygen may be intercalated into the metallically applied layer, and hence the metallically applied layer need not be purely metallic and may have non-metallic phases. The metallically applied layer, however, has a significantly lower oxygen content than the oxide-ceramically applied layer. The first layer is therefore substoichiometric in form. "Substoichiometric" means that on deposition of the layer in question, the intercalation of oxygen is lower than is necessary to achieve a stoichiometric ratio in the deposited layer.

The concept underlying the solution provided by the invention is that a metallically applied layer can be deposited in a significantly more compact and dense form, advantageously, owing to the lower melting temperature of the metal by comparison with the corresponding metal oxide, under otherwise identical process conditions, than an oxide-ceramic layer of the associated metal oxide. The stems in the metallically deposited layer are generally smaller than the stems in the corresponding oxide-ceramically deposited layer. As a result of the switch between layers with lower or higher oxygen content (metallically and oxide-ceramically applied layers), moreover, the stem structure of the electrolyte that is characteristic of coating processes, where individual stems are able typically to extend over the entire thickness of the electrolyte, in the case of a conventional electrolyte of 8YSZ produced by PVD, is interrupted, and the elongate extent of the crystallites in the direction of growth is limited to the thickness of an interlayer. Since the electrolyte is not subjected to any subsequent sintering process, the morphology and the preferred orientation of the crystallites in growth direction are retained. In general this is positive for the oxygen ion conductivity of the electrolyte. Originally, the metallically applied substoichiometric layer has a zero or extremely low conductivity for oxygen ions, but the oxygen ion conductivity of the electrolyte increases significantly when the electrolyte is deployed in air or an oxygen-containing atmosphere as for example during the initial minutes of first operation of the cathode-electrolyte-anode unit, and oxygen ions are intercalated into the metallically deposited layer or layers. The chemical composition of the individual layers of the electrolyte is in that case substantially identical, although structural differences, in the crystal system, for example, in which the crystallites of the originally metallically applied substoichiometric layers and oxide-ceramically applied layers have possibly undergone differences in crystallization, can continue to be retained. As a result of the intercalation of oxygen, there is an increase in volume of the metallically applied layer with the originally low oxygen content, and, as a result of this, the metallically applied layer may be additionally compacted and any interstices may be reduced in size. In view of the compositions, which are comparable down to traces elements, the bordering layers of the electrolyte are chemically stable with respect to one another, and have comparable coefficients of thermal expansion.

In a first basic embodiment, the electrolyte has two layers: a first layer with lower oxygen content, which is preferably metallically applied, and a second layer with higher oxygen content, which is preferably oxide-ceramically applied. Apart from the oxygen content and any impurities or trace elements, there is no difference in the chemical composition of the two layers. Particularly in the case of electrode material containing rare earth elements or alkaline earth elements, there may be at least one further functional layer between electrolyte and electrode, such as a CGO diffusion barrier layer, for example. The metallic layer with lower oxygen content is typically applied as a top layer to the oxide-ceramic layer with higher oxygen content.

In one preferred embodiment the switch between the layers with different oxygen contents (oxide-ceramically and metallically applied) is repeated a number of times, in which case the electrolyte consists of a layer system of at least three interlayers, where first, metallically applied layers with lower oxygen content and second, oxide-ceramically applied layers with higher oxygen content are arranged in an alternating fashion one above another. The composition of the individual oxide-ceramically and metallically applied layers is preferably the same.

In the case of a three-layered electrolyte layer system, therefore, the sequence of the layer arrangement is therefore as follows: interlayer with higher oxygen content, interlayer with lower oxygen content, interlayer with higher oxygen content (and applied oxide-ceramically/metallically/oxide-ceramically), or interlayer with lower oxygen content, interlayer with higher oxygen content, interlayer with lower oxygen content (and applied metallically/oxide-ceramically/metallically). The advantages of the invention are manifested especially for multiple switching between layers with different oxygen contents; in advantageous variant embodiments, the multi-layered electrolyte may have from a total of four interlayers (that is, in alternating arrangement, a total of two oxide-ceramically applied layers with higher oxygen content and two metallically applied layers with lower oxygen content) through to a total of 50 interlayers (that is, in alternating arrangement, a total of 25 oxide-ceramically applied layers with higher oxygen content and 25 metallically applied layers with lower oxygen content). For a given overall electrolyte thickness, a greater number of thin, alternating applied interlayers is advantageous for the gas-imperviosity of the electrolyte, since the stem, columnar structure of the crystallites, at whose grain boundaries elongate interstices extending over the entire thickness of the interlayer may form, is interrupted more frequently. Furthermore, by the multiple repetition of the layers with different oxygen contents, potential layer defects in the substrate on which the electrolyte is applied are able to heal more effectively. It should be noted, however, that a very large number of interlayers may possibly have adverse consequences for the oxygen ion transport capacity of the electrolyte, owing to the large interface between the interlayers.

Although layer thicknesses of less than 200 nm can usually be realized by means of vapour deposition processes, it is found that a minimum thickness of an interlayer (metallically or oxide-ceramically applied) of about 200 nm is advantageous. The layer thickness of the metallically applied interlayer with lower oxygen content is not to exceed 800 nm, more particularly 500 nm, since the later intercalation of oxygen means that there is an increase in volume and hence a risk of flaking or delamination of the interlayer. For a given leakage rate, therefore, the layer thickness can be reduced and hence the ohmic resistance reduced by using the multi-layered electrolyte of the invention.

One material particularly suitable for producing the multi-layered electrolyte is zirconium doped with alkaline earth elements or rare earth elements, $Ln_yZr_{1-y}$, where Ln=Y, Sc, Yb or Er and $0.08 \leq y \leq 0.12$, for the metallically deposited interlayers, and a corresponding oxide in a stoichiometric ratio $Ln_yZr_{1-y}O_{2-\delta}$ where Ln=Y, Sc, Yb or Er and $0.08 \leq y \leq 0.12$, for the oxide-ceramically applied interlayer. Also suitable is doped cerium $A_xCe_{1-x}$, where A=Gd, Sm, Y or Ca and $0.05 \leq x \leq 0.3$, for the metallically applied interlayer, and corresponding doped cerium oxide $A_xCe_{1-x}O_{2-\delta}$, where A=Gd, Sm, Y or Ca and $0.05 \leq x \leq 0.3$, for the oxide-ceramically applied layer. Some oxygen may have been intercalated into the metallically deposited interlayers, but the oxygen content is substoichiometric and is significantly lower than in the interlayer applied oxide-ceramically.

A key advantage of the invention is that in order to produce the multi-layered electrolyte it is possible to avoid an expensive, energy-consuming and time-consuming sintering operation at high temperatures. A physical vapour deposition process is employed as the coating process for manufacturing the electrolyte. In this process, the electrolyte material is converted into the gas phase and supplied to the substrate to be coated, where it condenses. In alternating sequence, a layer with lower oxygen content and a layer with higher oxygen content (metallically or oxide-ceramically applied layer) are applied one above another to a porous substrate such as the electrode or, optionally, a further functional layer, if a functional layer is provided between electrode and electrolyte. Coating processes for the invention include, in particular, sputter deposition processes such as DC sputtering, RF sputtering, ion beam sputtering, magnetron sputtering or reactive sputtering.

DESCRIPTION OF THE INVENTION

Figure 4:
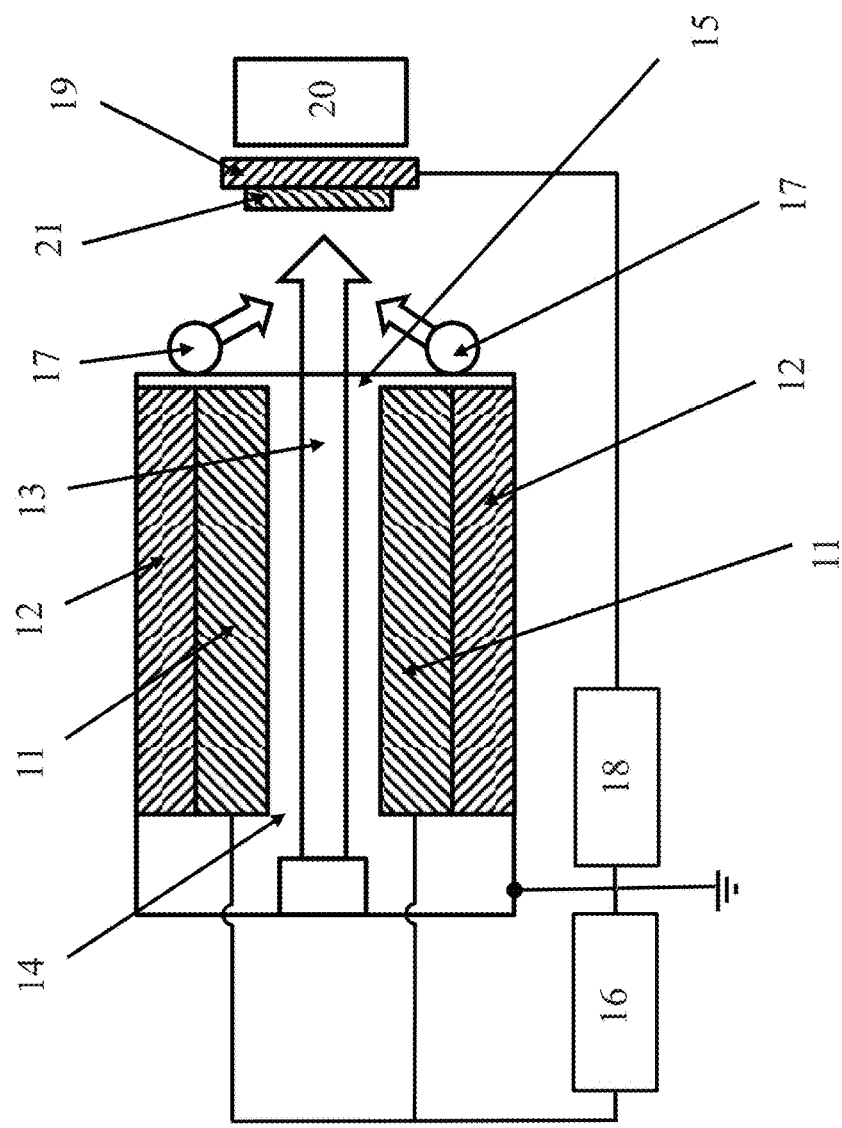
FIG. 4 is a schematic outline of a hollow cathode gas flow sputtering process.

Proving to be particularly advantageous is what is called hollow cathode gas flow sputtering, a specific sputter deposition process in which solid material is eroded by cathodic atomization in a hollow cathode glow discharge, and is transported by means of a working gas, usually argon, which flows through the hollow cathode, to the substrate, which is located outside the hollow cathode, where it deposits as a layer. FIG. 4 shows a schematic outline of this process. The sputtering target 11 has the form of a hollow cathode, usually in the form of two rectangular plates arranged in parallel, or in the form of a short tube, through which working gas 13 flows, flowing from a back opening 14 in the hollow cathode and emerging at a front opening 15, and, in so doing, carrying with it the atomized cathode material. The hollow cathode is cooled with the cooling system 12. The target is atomized by ions of working gas from the glow discharge, with the geometry of the hollow cathode intensifying the glow discharge. The glow discharge is ignited by the threshold voltage 16. The typical working pressure is 0.2-0.8 mbar. On account of the comparatively high process pressure, the high-energy plasma particles lose the majority of their energy on the way to the substrate, allowing low-stress layers to be generated.

Oxide layers can be produced in a reactive operation. For this purpose, oxygen 17 is supplied as reactive gas at the mouth of the hollow cathode, where the mixture of the working gas with the atomized cathode material emerges as a flow from the hollow cathode. As a result of the flow of the working gas, the reactive gas is unable to penetrate to the surface of the target, thereby preventing plasma instabilities or a reduction in rate of the kind often occurring with reactive magnetron sputtering. Since there is no need for a magnetic field, target erosion is uniform and a very high power density can be operated, to the benefit of a high coating rate. One particular advantage of hollow cathode gas flow sputtering in relation to the present invention is that the switch between metallically and oxide-ceramically applied layers during the coating operation can be easily accomplished by switching on and off the supply of reactive oxygen gas, respectively, with otherwise identical parameters, and allowing the multi-layered electrolyte to be produced in succession and without interruption in one production unit, without any need for the sample to be cooled or the coating chamber opened between the coating procedures. As a result, it is possible to obtain very good contact and adhesion between the individual layers. Owing to residual oxygen in the production unit, some oxygen may also be intercalated into the metallically applied layer, and the metallically applied layer need therefore not be purely metallic and may have non-metallic phases. However, it has a significantly lower oxygen content than the oxide-ceramically applied layer. Additionally, on the substrate, it is possible to apply a bias voltage 18 between anode and substrate holder 19, in order to raise the energy input of the working gas ions on the substrate and to compact the deposited layer. It may be advantageous for layer formation to heat the substrate holder (ceramic heater 20). In order to be able to coat relatively large areas, the substrate holder 19 with the sample 21 to be applied by coating must be moved in front of the source. This may be accomplished either by a back-and-forth motion or by slowly passing the substrate holder in front of the source. As well as the bias voltage, the substrate temperature, the flow of working gas, the reactive gas flow, and the distance between threshold front and substrate surface play a part in the coating rate and in the deposited layer structure. An apparatus for hollow cathode gas flow sputtering is described in EP1520290 B1, for example.

The cathode-electrolyte-anode unit of the invention can be used for anode-supported and cathode-supported SOFCs, especially for MSC, where the cathode-electrolyte-anode unit is applied to and supported on a metallic carrier substrate. Alternatively, for example, it may be employed for an electrolyzer or in membrane technology for electrochemical gas separation.

Figure 1:
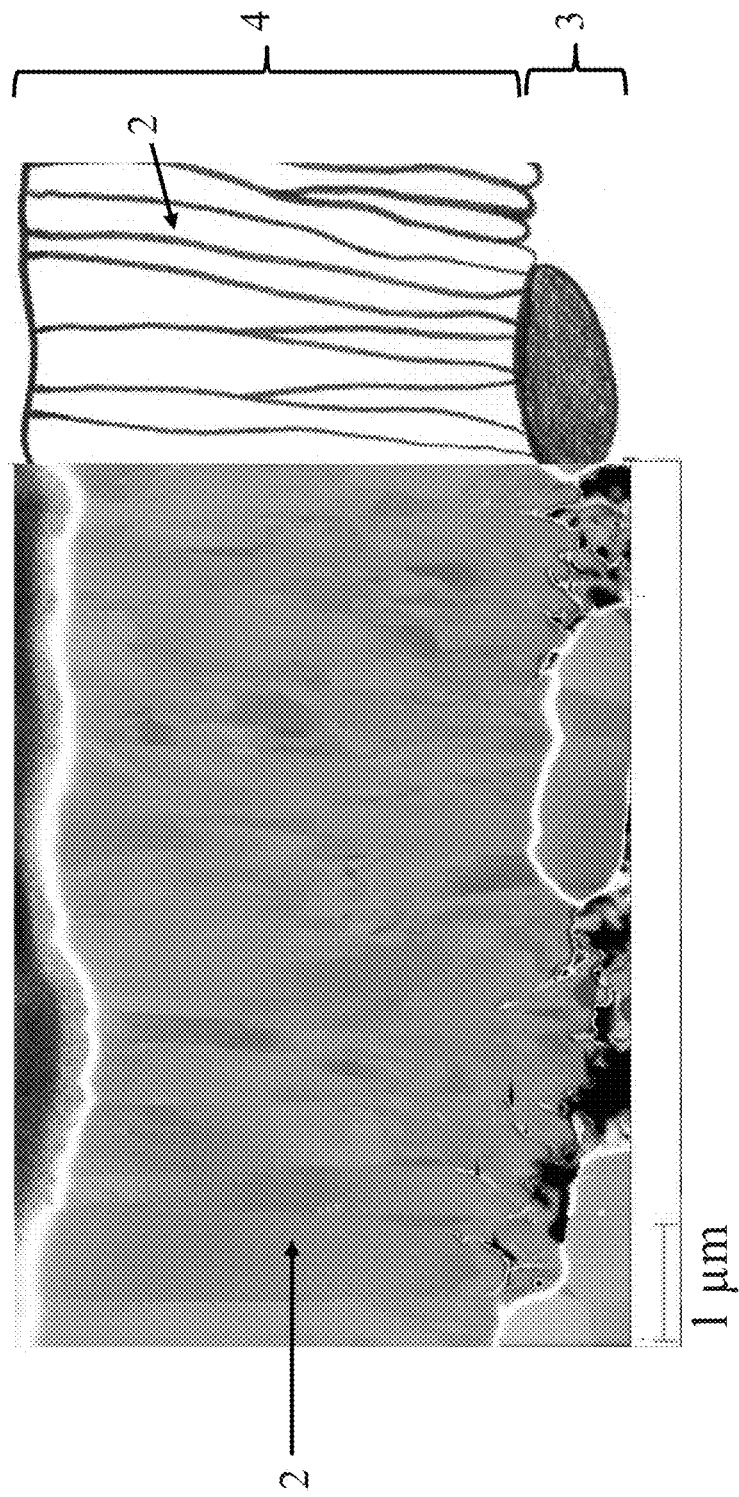
FIG. 1 is an illustration of a metal-supported SOFC (MSC) according to the prior art.
Figure 2:
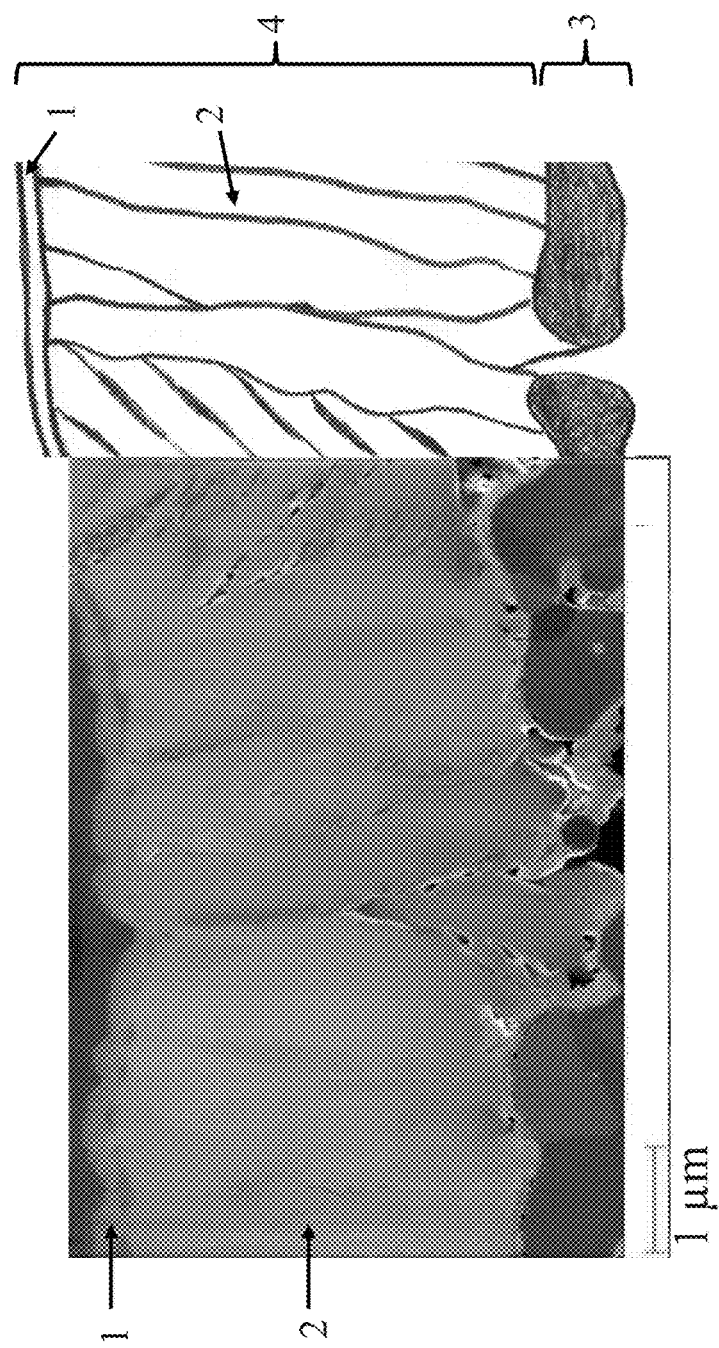
FIG. 2 is a cross-section of an MSC according to the invention.
Figure 3:
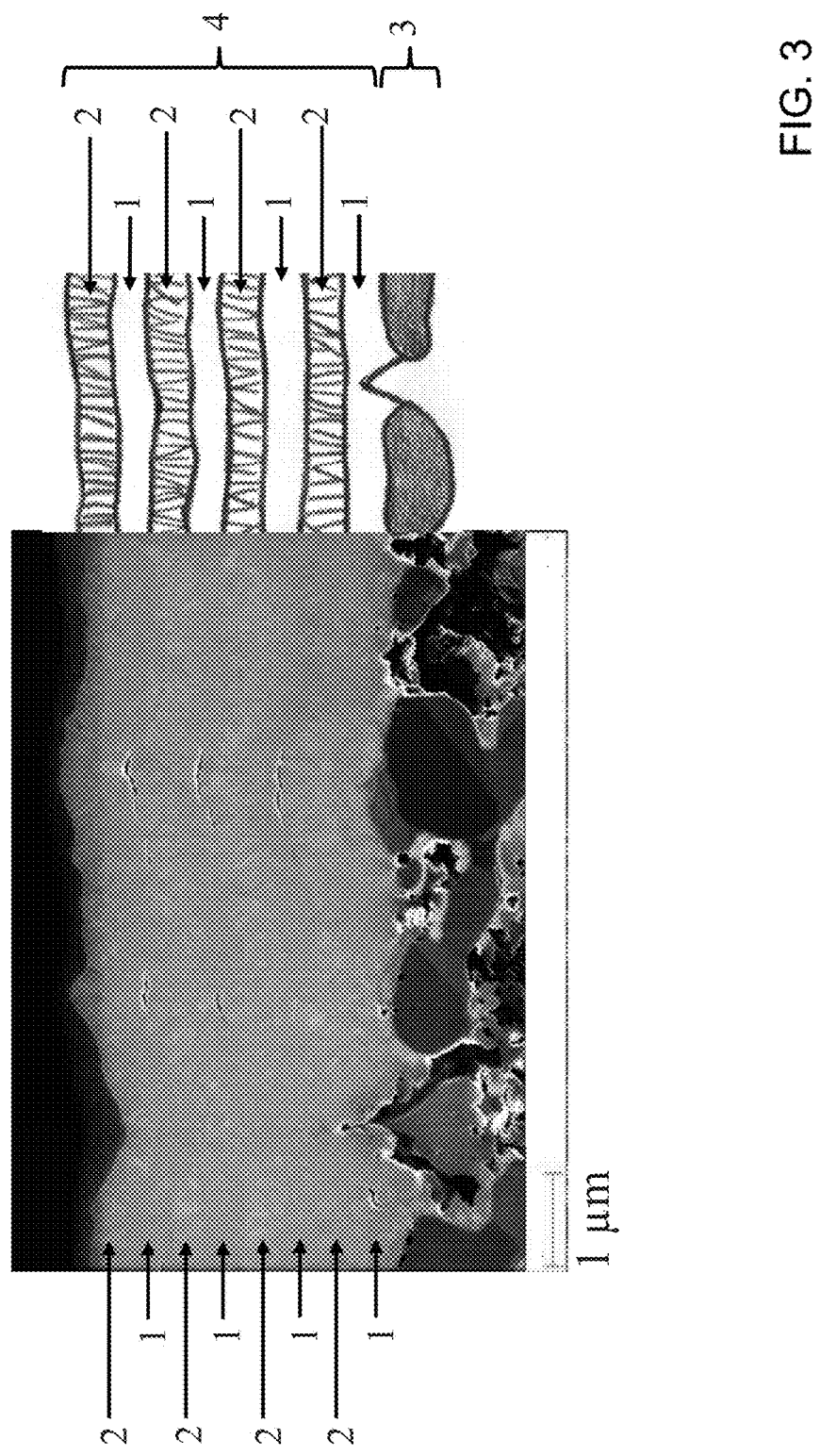
FIG. 3 is a cross-section of an MSC according to the invention.

The invention is elucidated in more detail using the following examples, with reference to FIGS. 2 and 3. The examples in FIG. 2 and FIG. 3 show an MSC in cross section, and are inventive developments on from the prior-art MSC shown in FIG. 1. The figures have been schematically supplemented on one side in order to illustrate the structures. The metallic carrier substrate of the MSCs is produced by powder metallurgy in each case, in accordance with AT 008 975 U1, and consists of a ferritic iron-chromium alloy (Fe>50% by weight and 15% to 35% by weight Cr) with an additional mixed oxide fraction (0.01-2% by weight, the mixed oxides coming preferably from the group of Y,Sc and rare earth metals and/or from the group of Ti, Al and Cr) and with a porosity of 30-60%. Applied to this porous metal substrate acting as carrier, by means of PVD, is a CGO diffusion barrier layer, in order to prevent interdiffusion between metal substrate and the subsequent anode. The anode 3 takes the form of a multi-layered, graduated anode layer composite of Ni-8YSZ cermet with a thickness of about 30 to 50 µm, and is produced by a wet-ceramic route (screenprinting process) and then sintered in a reducing atmosphere at about 1200° C. for five hours. The electrolyte layers 4 are generated by vapour deposition in a hollow cathode gas flow sputtering unit, employing a metallic ZrY sputtering target (Zr 85.2 at %, Y 14.8%). The metallic target is available commercially, for example, from MaTecK GmbH or from Sindlhauser Materials GmbH. Prior to the actual coating, the substrate is precleaned with liquid cleaners in an ultrasound bath. The coating procedure chamber is evacuated (chamber volume approximately 200 l, pump unit suction capacity 1000 m$^3$/h) and the substrate is heated slowly (max. 20 K per minute) to about 500° C. and then cleaned with an argon plasma (generated by applying a medium-frequency DC pulse bias voltage with nominal bias voltage >100 V, 200 kHz and 1 μs counter-pulse duration), with an operating pressure of around 0.1 mbar for an Ar volume flow of around 400 sccm. This "fine ion cleaning" process is followed by the coating procedure proper. The parameters set out below relate to a gas flow sputtering source with a design length of 250 mm, and need to be adapted—by linear scaling, for example—for different-size sources. The process gas used is argon, with a volume flow of approximately 5000 sccm (development of a hollow cathode discharge for a given source design length and an operating pressure of around 0.5 mbar); the reactive gas used is oxygen, with a volume flow of approximately 60 sccm. The source voltage between cathode and anode is around 330 V, and in this case a power of approximately 5000 W is realized in the plasma. In the course of coating, a nominal medium-frequency bias voltage of about 30-150 V is set between substrate (sample) and cathode (200 kHz, 1 μs counter-pulse duration) (the level of the nominal bias voltage is dependent on factors including the desired density of the sputter layer and/or the type of substrate present, and also on the distance between substrate and source front (in this case around 40 mm), and can be adapted by the skilled person to the particular situation).

In example 1 (FIG. 2) an electrolyte 4 approximately 4 μm thick is produced, with the first 3.5 μm having been deposited with supply of oxygen, and a top layer approximately 0.5 μm thick having been applied without supply of oxygen as reactive gas. The electrolyte 4 thus comprises a 3.5 μm layer with higher oxygen content, and a 0.5 μm top layer with lower oxygen content.

Example 2 (FIG. 3) features an electrolyte layer assembly with a total of 8 interlayers: applied alternately, beginning with a metallically applied layer 1, was in each case an interlayer about 0.5 μm thick, without reactive gas, and an interlayer about 0.5 μm thick with supply of reactive gas.

Applied to this electrolyte in each case was a further CGO protective layer 1 to 2 μm thick, by means of a PVD process. This protective layer prevents chemical reaction between electrolyte and cathode material, particularly the formation of strontium zirconates (LaSrZrO, SrZrO). In conclusion, a porous cathode 20 to 60 μm thick and made of lanthanum strontium cobalt iron oxide (LSCF, $(La_{0.6}Sr_{0.4}Co_{0.8}Fe_{0.2})O_{3-\delta}$) is applied by screenprinting methods, it becomes possible for the sample to be subjected, optionally, to an additional plasma treatment prior to screenprinting. The cathode is activated in situ during the initial hours of operation of the cell. With the examples shown in FIGS. 1-3, there is no CGO protective layer or no cathode in each case.

In both exemplary embodiments, the multi-layered structure of the electrolyte can be seen. The columnar structure of the electrolyte, which may extend over the entire thickness of the electrolyte from the example in FIG. 1 known from the prior art, is interrupted and is restricted to the thickness of an interlayer. The crystallites of the metallically deposited layers 1 and oxide-ceramically deposited layers 2 differ in morphology and in the crystal system formed. Whereas the individual stems of the oxide-ceramically deposited layer 2 form a tetragonal or cubic crystal system typical of 8YSZ and are arranged in columnar fashion preferably in the growth direction, the crystallites of the metallically deposited layer 1 are smaller and have generally crystallized out in other crystal systems, owing to the absence of oxygen atoms. In an X-ray diffraction phase analysis (instrument used: AXS D4 Endeavor from Bruker), however, the metallically deposited layer 1 does not show any purely metallic phases, but instead a hexagonal phase (characteristic of $Zr_3O$) and a cubic phase (characteristic of $YZrO_3$), this being attributable to the residual oxygen present, which is in the production unit for longer on switchover from reactive to metallic. If the electrolyte is stored in air (at 500° C., holding time 20 hours), then monoclinic phases characteristic of $ZrO_2$ may additionally be found.

In subsequent operation, a tetragonal or cubic crystal system comes about in the metallic layer as well, as a result of intercalation of oxygen.

In accordance with the invention, a gas-impervious electrolyte with a thickness of 4 μm was produced. The electrolyte in example 1 (FIG. 2) has a leakage rate of $7.6 \cdot 10^{-4}$ hPa dm$^3$ s$^{-1}$ cm$^{-2}$; the electrolyte in example 2 (FIG. 3) has a leakage rate of $2.9 \cdot 10^{-4}$ hPa dm$^3$ s$^{-1}$ cm$^{-2}$ (measured in each case at room temperature in air with the pressure increase method (Dr. Wiesner, Remscheid, type: Integra DDV) with a pressure difference dp=100 hPa). Apart from trace elements, the electrolyte has no elements other than yttrium, zirconium and oxygen.

The invention claimed is:

1. A cathode-electrolyte-anode unit for an electrochemical functional device, the unit comprising:
    a porous anode and a porous cathode;
    a multi-layered solid electrolyte arranged between said porous anode and said porous cathode;
    said solid electrolyte having characteristics of being formed of a layered structure of at least one first layer and at least one second layer;
    said at least one second layer having a higher oxygen content than said at least one first layer, and said at least one first layer and said at least one second layer having the same composition except for oxygen;
    said at least one first layer being a metallic PVD layer formed of a deposited mixture of metals converted beforehand, by way of a sputtering process, into gas phase; and
    said at least one second layer being an oxide-ceramic PVD layer formed of the mixture of metals converted beforehand into the gas phase, or a gaseous mixture, with supply of oxygen or of an oxygen-containing gas as reactive gas or by using a sputtering target consisting of the metal oxide.

2. The cathode-electrolyte-anode unit according to claim 1, configured for a high-temperature fuel cell.

3. The cathode-electrolyte-anode unit according to claim 1, wherein said solid electrolyte comprises an alternating layer sequence wherein said at least one first layer with lower oxygen content and said at least one second layer with higher oxygen content are arranged alternately one above another.

4. The cathode-electrolyte-anode unit according to claim 3, wherein said solid electrolyte is composed of an alternating layer sequence of a total of at least two said first layers with lower oxygen content and at least two said second layers with higher oxygen content.

5. The cathode-electrolyte-anode unit according to claim 1, wherein said one or more first layers with lower oxygen content and said one or more second layers with higher oxygen content form different crystal structures.

6. The cathode-electrolyte-anode unit according to claim 1, wherein said one or more first layers with lower oxygen content has or have in each case a layer thickness of between 200 and 800 nm.

7. The cathode-electrolyte-anode unit according to claim 6, wherein the layer thickness lies between 300 and 500 nm.

8. The cathode-electrolyte-anode unit according to claim 1, wherein each of said one or more second layers with higher oxygen content has or have in each case a layer thickness of between 200 and 800 nm.

9. The cathode-electrolyte-anode unit according to claim 1, wherein a layer thickness of said solid electrolyte is between 1 and 10 μm.

10. The cathode-electrolyte-anode unit according to claim 1 in combination with a metal-substrate-supported fuel cell, an anode-supported fuel cell, or a cathode-supported fuel cell.

\* \* \* \* \*